Patented Jan. 20, 1931

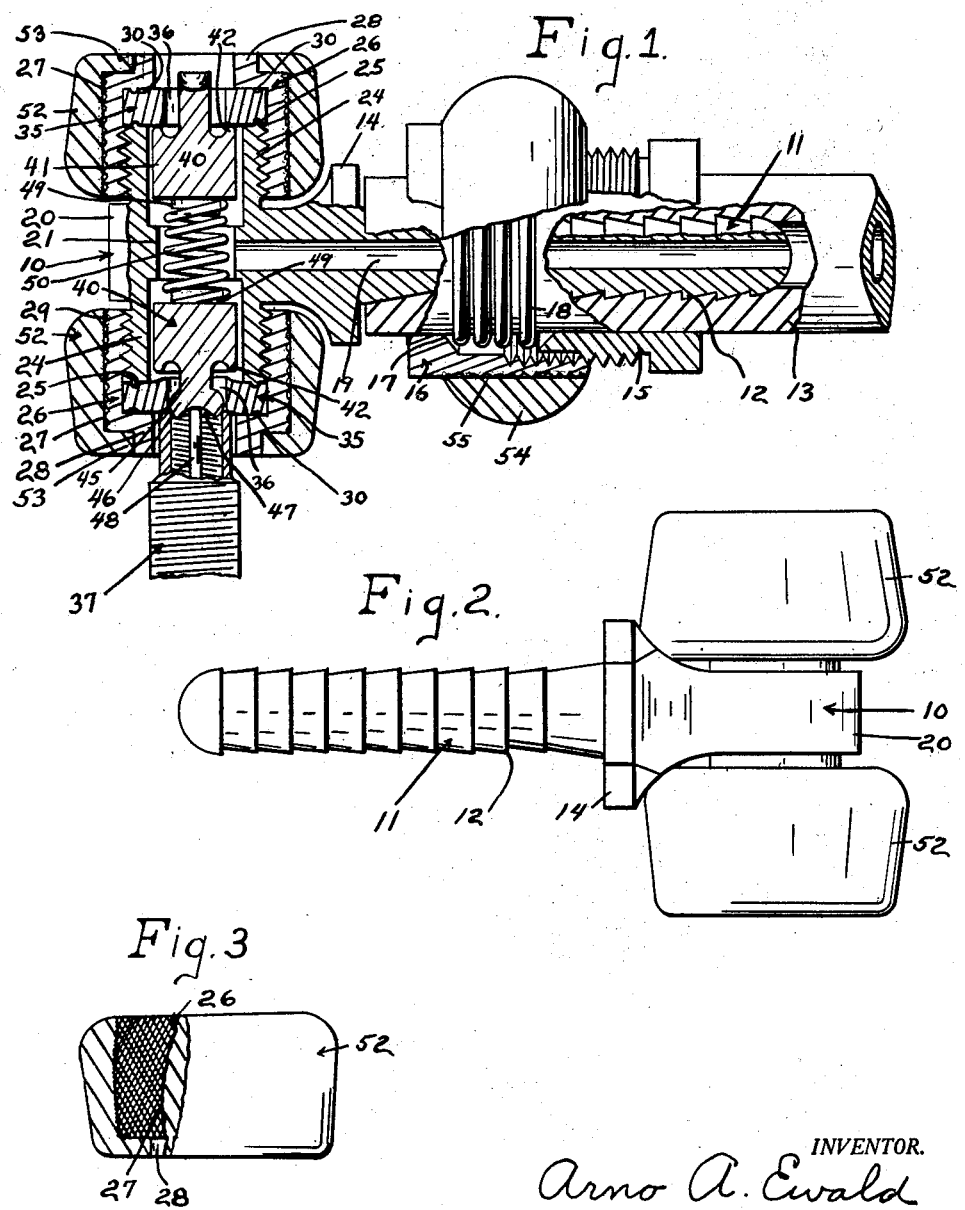

1,789,306

UNITED STATES PATENT OFFICE

ARNO A. EWALD, OF OAKFIELD, WISCONSIN

TIRE-FILLING VALVE HEAD

Application filed January 28, 1924. Serial No. 688,990.

This invention relates to improvements in tire filling valve heads.

It is the object of this invention to provide a novel and improved duplex valve head suitably cushioned against injury from blows and having independently replaceable parts whereby any portion of the valve, which is subject to wear, can be repaired or replaced independently of the remaining portions thereof.

It is a further object of this invention to provide a novel and simplified valve construction embodying a duplex head in which various valve parts are employed in common by several valve mechanisms to the end that a valve head may be provided which is capable of giving double service at materially less than twice the cost of a single valve mechanism.

It is a further important object of this invention to provide a novel arrangement of protective cushions for such valve mechanism as is used for the purpose above indicated. I am aware that valve mechanisms for inflating pneumatic tires have heretofore been provided with resilient casings for their protection, but it is my purpose to improve upon such casings as have heretofore been made by providing a series of casings which may be independently secured to the valve head for manual co-operation and may be independently removed therefrom for replacement. It is also my purpose to design my improved valve head in such a manner that new protective resilient casing units may be supplied thereto by inexperienced operators and without any necessity for returning the entire head to the factory for purposes of repair.

Other objects of this invention relate to improved means for ensuring an air tight joint between the tire nipple and the valve during the filling operation, such means including a resilient gasket secured in place in a novel manner.

In the drawings:—

Figure 1 is an axial section throughout the valve head and stem.

Figure 2 is an exterior plan view of the device shown in Figure 1.

Figure 3 is a detail view showing a ring nut with a protective rubber casing partially stripped therefrom.

Like parts are identified by the same reference characters throughout the several views.

The casing 10 of the valve comprises the head of a T-shaped fitting, of which the shank 11 of the valve comprises the stem. Shank 11 is peripherally grooved to provide an axial series of frusto conical flanges 12 which bite into the interior of rubber hose 13 in the usual manner. The extremity of the hose abuts a limiting flange 14 formed upon the head and preferably constructed to provide a hexagonal periphery as indicated.

The rubber hose 13 is secured to neck 11 of the valve by means of a sleeve 15 threaded externally and fitting closely upon hose 13. This sleeve co-operates with a nut 16 which is in threaded engagement therewith and has a portion 17 of reduced internal diameter whereby to fit closely upon the hose. Interposed between the portion 17 of the nut and the body of sleeve 15 is a wire bushing 18 which, under pressure of the nut and sleeve, is compressed upon the hose to force the hose into operative engagement upon the peripheries of the frusto conical flanges 12 of the valve stem 11. With the hose thus secured to the stem, air or other fluid under pressure which is conveyed by the hose is admitted through the bore 19 of the stem and the hollow interior of the valve casing 10.

The valve casing 10 includes a central cylindrical barrel 20 having an interiorly disposed peripheral flange 21 which serves as a guide for the valve spring 50. The bore 19 of the valve stem opens through the flange 21 as illustrated.

Projecting axially from either end of the cylindrical barrel 20 of the valve casing 10 are the integral, exteriorly threaded, sleeves 24 terminating in relatively sharp annular flanges 25. Threadedly engaged with each of the sleeve portions 24 of the casing is a ring nut 26 having a knurled or otherwise excoriated or abraded surface at 27 and an end portion 28 of reduced diameter, both internally and externally. It will be noted also that the surface 27 of the nut is slightly convex and is of less diameter at 29 at the inner end of the nut than it is in intermediate portions thereof. Interiorly, the nut provides, concentric with its axis, an annular flange 30 complementary to, and in registry with, the flange 25 of sleeve 24.

Engaged between the sleeve and the nut is a flexible gasket 35 which is preferably made of rubber or the like and has its margin bitten by the opposed flanges 25 and 30. This gasket is thereby securely retained in position and its central portions are left free for flexion. The gasket is provided with a central aperture at 36.

Gasket 35 serves as a seat, both for the nipple 37 of the tire valves and also for the valve proper of the device under discussion. The valve body of this device is shown at 40 and comprises a cylinder 41 substantially smaller in diameter than the interior bore of sleeve 24 and terminating in an annular marginal flange 42 arranged to contact operatively with the upper surface of gasket 35. A flattened actuating member for the valve projects axially therefrom at 45 and is provided with a crescent shaped head 46 within the pocket 47 of which the stem 48 of the tire valve is receivable. The crescent shaped head 46 is of such a diameter that it will be engaged by the inner end surface of tire nipple 37 and will be elevated by the pressure of said nipple immediately prior to or at the time of engagement of the nipple with the under surface of gasket 35 so that when the valve body 40 is elevated by pressure contact with nipple 37, the joint between said nipple and casing 10 will be sealed by the engagement of the nipple with gasket 35.

Each of the valve bodies 40 is provided at its inner end with an axial stud 49. A centrally located helical compression spring 50 is seated about each of the studs 49 to force each valve body 40 to its seat against its respective gasket 35. The length of spring 50 is thereby increased over the length of a corresponding spring disposed in a valve head of the usual construction. The increase in length makes it possible to use a size and weight of spring which, for a given degree of resilience, will be much stronger and more lasting than a spring of half its length, such as would be employed in the ordinary valve head. Likewise, for a given degree of strength and lasting quality, spring 50 may be made much more resiliently yieldable than the ordinary valve spring. The internal annular flange 21 serves not only to guide the intermediate portion of the spring and thereby keep the spring from buckling, but also serves as a stop to limit the opening movement of each of the two valve bodies 40. The stop is not ordinarily used, but in extreme cases of overload the stop will relieve the spring.

From the foregoing, it will be obvious that a single valve spring 50 is made to serve the purposes of two independently operable valve mechanisms. The valve casing 10, with but little material additional to what would be required for housing a single valve, is also adapted to serve the purposes of two independent valve mechanisms. Consequently, the operator of a device of this character will obtain double service at materially less than the cost of two independent valve coupling heads.

Each of the ring nuts 26 and also the ring nut 16 is preferably provided with a cushion of rubber, or the like, to protect the entire device from damage due to blows. It will be understood that a valve coupling head, such as that herein disclosed, is mounted at the end of a comparatively long length of hose of which the portion 13 is the extremity. Being so mounted, it is thrown about when in use and is frequently dropped to the pavement or is allowed to swing into contact with hard objects. In order to prevent valve heads from damage under such treatment, they have heretofore been completely encased in a rubber jacket, which is so formed that it can be positioned on the head only by a manufacturing process. Consequently, when this jacket becomes worn or torn free of the head, the valve casing is left unprotected and must be either returned to the factory for the restoration of the protective covering thereon, or must be discarded and a new device substituted.

I have found that it is unnecessary to cover the entire head and that equally good protection is afforded by means of resilient cushions properly placed upon the head. In working out the placing of these cushions, I have so designed them that each one is mounted on a small and comparatively inexpensive part of the head which is subject individually to ready replacement if the particular cushion carried thereby becomes damaged or lost. In this manner I prolong indefinitely the life of a valve coupling head of the character described, since there is now nothing in the construction of the head herein disclosed which cannot be readily and immediately replaced by unskilled operators without requiring any large or costly parts and without requiring the renewal of the entire or any major portion of the device.

The cushions 52 are generally frusto conical in shape, having their greatest diameter at their inner ends. Their taper toward their outer ends is comparatively slight and they are preferably rounded, as shown, so as to present no sharp corners which might be particularly subject to injury due to abrasion or cutting. The outer extremity of each cushion 52 is extended at 53 about the end of the major portion of ring nuts 26 and into contact with sleevelike projection 28 of the nut. If the cushion extended entirely to the axial center of the nut, it would be torn and cut by the extremity of each valve nipple 37 pressed therethrough. Consequently, I leave the end of the axial sleeve 28 uncovered and it offers a wear resisting surface to the ends of nipples 37. At the same time, I have found that it is unnecessary to provide more cushion than is illustrated herein, since the valve head in falling or swinging tends to assume such positions as will bring the cushion into contact with the pavement. In practice the sleeves 28 never hit the pavement but are always protected by the surrounding cushion.

Due to the convexity of the knurled surface 27 of ring nuts 26, the annular rubber cushions 52 must be forced into place over said nuts. When in place, they are preferably secured by vulcanization, cement, or otherwise, although the convexity of the nut and the knurled surface thereof are entirely adequate to retain the cushion thereon under ordinary circumstances of use.

It will be noted that when one of the cushions becomes so worn or mutilated that its replacement is desirable, it is possible merely to press a new cushion into place over the old nut or, if a more secure fastening is desired, it is possible merely to replace the entire nut with a substitute nut upon which a new cushion is already vulcanized. The old nut may then be destroyed, since its value is small, or may be returned to the factory to have a new cushion vulcanized thereto. In either case the replacement may be accomplished by the most unskilled operators without material expense and without material loss of time.

It will be noted further that the parts of the entire mechanism are extremely few and there is little to get out of order. The part which is most subject to wear is gasket 35 and this part is so mounted as to minimize wear thereon, due to the fact that the biting flanges 25 and 30 are exactly opposite to each other, so that flexion of the washer will occur evenly and without undue stress.

Furthermore, in order to replace gasket 35, it is only necessary to remove the same ring nut 26 which carries the rubber cushions 52. Thus it is possible, when a cushion is replaced, to examine, without further effort, and replace, if necessary, the gasket 35.

The nut 16, which secures the hose 13 to valve stem 11, is preferably provided also with a cushion 54. The outer circumference 55 of nut 16 is knurled to provide an anchorage for the annular rubber cushion 54 but, since there are no axial end surfaces to be protected upon this part of the device, the cushion need not be extended about the end of the nut as is done at 53 in the case of cushions 52.

So far as the two cushions 52 are concerned, it will be obvious that although such cushions do not enclose the barrel portion 20 of the valve casing 10, they nevertheless give all metal parts of the casing entirely adequate protection. When it is borne in mind that the valve casing is connected to the end of a hose 13, it will be noted that it is a practical impossibility to drop such casing to the sidewalk in such a manner that any metal part thereof will strike the walk. On the other hand, if it should happen that one of the cushions 52 is subjected to more wear than the other, such cushion may be replaced independently of the other to restore the device to its original condition.

It is the function of cushion 54 to protect the mechanism within casing 10 from injury due to the contact of the metal parts of the hose clamp with hard objects. However, this cushion is less necessary than those first described, since shock can be transmitted from the ring nut 16 and sleeve 15 of the hose clamp to the casing only through the interposed wall of hose 13. Where the annular cushion 54 is employed, however, it co-operates with the cushions 52 to provide a third point for the support of the entire article from the pavement upon which the device may have been tossed. Moreover, this cushion, like those previously described, may readily be replaced either by the renewal of the cushion proper or by the replacement of ring nut 16 by which the cushion is carried.

It will be seen from the foregoing description that this device fully satisfies the objects specified for this invention, and the advantages and economy of the construction herein disclosed must now be apparent.

I claim:

1. As a new article of manufacture, a ring nut provided with an axial extension of comparatively small diameter, whereby a shoulder is formed adjacent the end of said nut, in combination with an elastic cushion encircling said nut and provided with a portion extending to said axial extension about said shoulder.

2. As a new article of manufacture, a ring nut having an axially extended portion providing a shoulder adjacent the end of said nut, in combination with an elastic cushion encircling said nut and having its inner surface interlocked with the exterior surface of said nut, said cushion being formed to extend about the shoulder of said nut to substantial contact with said portion, and the extremity of said cushion being substantially in the plane of the extremity of said portion.

3. In a device of the character described, the combination with a valve casing including a threaded sleeve portion, of a nut operatively engaged with said sleeve portion and shouldered adjacent its outer extremity to provide an axial extension in substantial alignment with said sleeve portion, and a cushion encircling said nut and sleeve portion and extended about said shoulder, said cushion being protected by said axial extension against injury from articles introduced into said casing.

4. A tire filling valve head comprising a valve casing provided at remotely spaced points with freely detachable cushion carrying devices, and a resilient cushion upon each of said devices having its outer end coextensive with the adjacent end of the carrying device to protect said casing from direct contact with a pavement in substantially any position of said casing and to co-operate in the support of said casing in the normal position thereof, said casing being provided with a laterally projecting connection for the end of a hose upon which said casing is adapted to be swung free and to contact with the pavement in any one of an infinite number of positions.

5. In a device of the character described, a valve casing comprising a stem adapted to receive connection with the end of a supply hose, a valve head disposed transversely across the end of said stem, valve means therein, a freely replaceable nut at each end of said head and mutually spaced elastic cushions encircling and coextensive with the outer end portions of the respective nuts, whereby said head will be protected from shock by said cushions in any angle at which it may swing at the end of a hose connected to said stem.

6. In a device of the character described, a valve casing comprising a stem adapted to receive the end of a hose, a head extending transversely across said stem, valve mechanism within said head requiring protection from shock, and a set of resilient cushions applied respectively in spaced relation about said stem, and having their outer ends coextensive with the adjacent ends of the casing, whereby said cushions provide a support for said head in substantially all positions thereof, and a multi-point support for said head in its normal position, whereby it is protected from the shock by a relatively small area of cushion material.

ARNO A. EWALD.